Jan. 9, 1923.
S. EARLL.
CULINARY DEVICE.
FILED MAR. 29, 1921.
1,441,974.
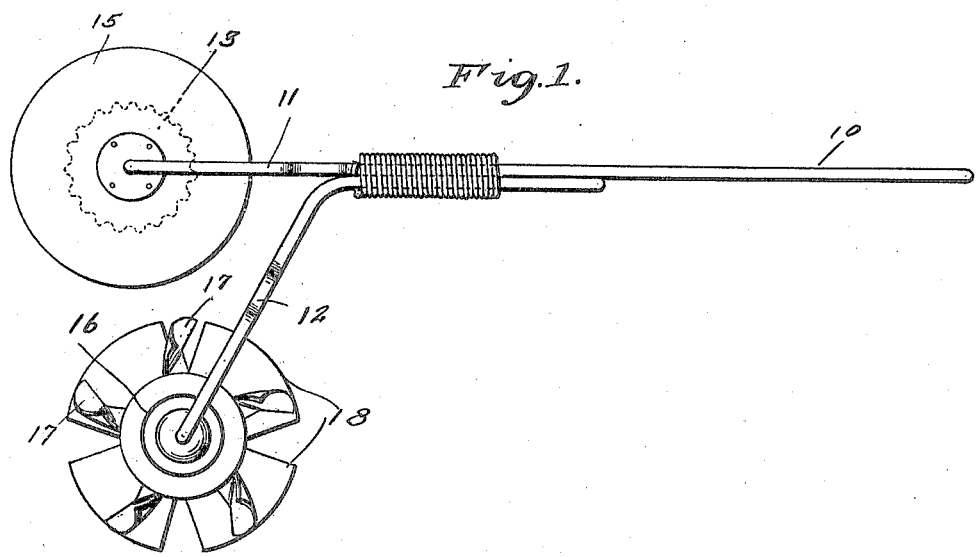
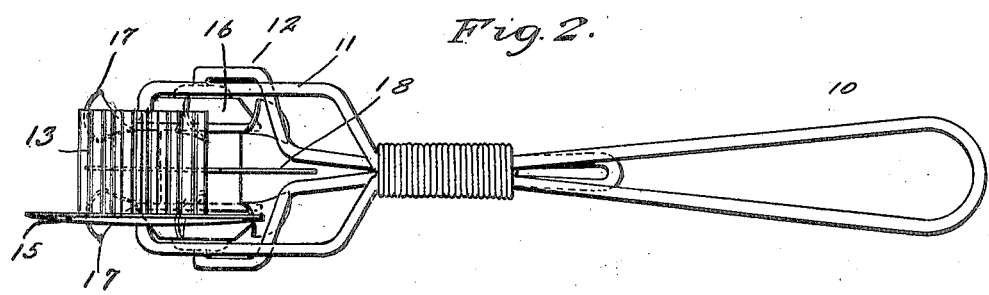
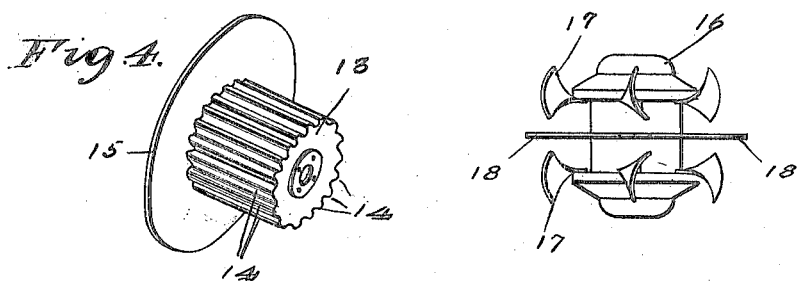
Sarah Earll INVENTOR
BY *Victor J. Evans*
ATTORNEY
WITNESSES Patented Jan. 9, 1923.

1,441,974

UNITED STATES PATENT OFFICE.

SARAH EARLL, OF RHINELANDOR, WISCONSIN.

CULINARY DEVICE.

Application filed March 29, 1921. Serial No. 456,779.

*To all whom it may concern:*

Be it known that I, SARAH EARLL, a citizen of the United States, residing at Rhinelandor, in the county of Oneida and State of Wisconsin, have invented new and useful Improvements in Culinary Devices, of which the following is a specification.

This invention comprehends the provision of an implement designed for use in making pies, and embodies a handle upon which is rotatably mounted spaced devices, one of which is used for perforating the top of the pie, the other of which is used for crimping and trimming the edge thereof.

The nature and advantages of the invention will be better understood when the following detailed description is read in connection with the accompanying drawing, the invention residing in the combination, construction, and arrangement of parts as claimed.

In the drawing forming part of this application, like numerals of reference indicate similar parts in the several views and wherein:

Figure 1 is a side elevation of the implement forming the subject matter of my invention.

Figure 2 is a top plan view.

Figure 3 is a detail perspective view of the perforating device.

Figure 4 is a similar view of the crimper and trimmer.

Referring to the drawing in detail, 10 indicates a handle which may be constructed of any suitable material and also vary in size, the handle being preferably formed from wire and provided with yokes 11 and 12 respectively, the latter arranged at an angle or inclination to the yoke 11. Journaled in the yoke 10 is a roller 13 which is corrugated as at 14 for a purpose to be hereinafter described, while carried by this roller is a comparatively large cutting disk 15.

Journaled in the yoke 12 is a roller 16 which supports spaced series of blades, the outermost series of blades being indicated at 17 and slightly curved as shown, while the intermediate series of blades indicated at 18 are preferably straight.

In use of the implement, the perforating device including the roller 16 is moved lightly over the top of the pie during which time the blades 17 and 18 perforate the top in a manner to permit of escape of steam as will be understood, and subsequent to this operation, the implement is reversed in the hand of the user so that the corrugated roller 13 can be run about the edge of the pie to crimp the same. During this use of the implement the cutting disk 15 simultaneously trims the edge of the pie. The implement is very simple in construction and can be manufactured and sold at a very nominal cost, and can also be very conveniently manipulated for the purposes intended.

While it is believed that from the foregoing description the nature and advantages of the invention will be readily apparent, I desire to have it understood that I do not limit myself to what is herein shown and described, and that such changes may be resorted to when desired, as fall within the scope of what is claimed.

What I claim is:

An implement of the character described comprising a handle, a yoke formed by one end of the handle and arranged in the same plane therewith, a second yoke arranged beneath and obliquely disposed with respect to the first mentioned yoke, said second yoke including a reduced portion arranged parallel with and in contacting engagement with said handle, a tying element wrapped around said parts to hold the latter together, a roller journaled in the first mentioned yoke, said roller being corrugated, a cutting disk carried by the roller and arranged at one end thereof, and a bladed roller journaled in the other of said yokes, certain blades of the latter mentioned roller being curved and other blades straight for the purpose specified.

In testimony whereof I affix my signature.

Mrs. SARAH EARLL.